(No Model.) 2 Sheets—Sheet 1.

G. H. WHITTINGHAM.
AUTOMATIC ELECTRIC SWITCH.

No. 415,487. Patented Nov. 19, 1889.

Witnesses
Maggie Turner
Henry H. Eames

Inventor
George H. Whittingham
By his Attorneys
Price & Stewart (No Model.) 2 Sheets—Sheet 2.
G. H. WHITTINGHAM.
AUTOMATIC ELECTRIC SWITCH.

No. 415,487. Patented Nov. 19, 1889.

Witnesses
Maggie Turner
Henry H. Eames

Inventor
George H. Whittingham
By his Attorneys
Price & Stuart

UNITED STATES PATENT OFFICE.

GEORGE H. WHITTINGHAM, OF BALTIMORE, MARYLAND, ASSIGNOR TO THE AUTOMATIC ELECTRIC SWITCH COMPANY, OF SAME PLACE.

AUTOMATIC ELECTRIC SWITCH.

SPECIFICATION forming part of Letters Patent No. 415,487, dated November 19, 1889.

Application filed February 21, 1889. Serial No. 300,718. (No model.)

*To all whom it may concern:*

Be it known that I, GEORGE H. WHITTINGHAM, a citizen of the United States, and a resident of the city of Baltimore and State of Maryland, have invented certain new and useful Improvements in Automatic Switches for Electric Motors, of which the following is a full and complete specification, reference being had to the accompanying drawings.

This invention has relation to an electric switch and mechanism operating in connection therewith for starting and stopping an electric motor or other electrical device, the object of the invention being to deliver the current to the motor or other device gradually instead of suddenly turning on the full force of the line-current, and to do this automatically, although the switch may have been turned on full, as is usually done by ignorant persons; also, to automatically replace a large resistance in the circuit, whether to armature or field, whenever the current is shut down or broken. A full current suddenly turned onto the armature or field would be likely to do great damage by burning out the insulation at some point. The gist of my invention, however, lies in the three following features: First, automatically reducing the resistance of a circuit after the current has been turned on by a switch, and doing this under the control of a governor, which controls and regulates the motion of the automatic resistance-reducing devices to any desired speed; second, automatically replacing the resistance in the circuit when the current is shut down or switched off, as would occur by a stoppage of the generating-dynamo or operation of the switch; and, third, leaving the apparatus when the current has been shut down or switched off in such position that it will operate automatically to start the motor and repeat the first-mentioned operation—that is to say, cut out the resistance automatically and gradually without being touched.

Figure 2:
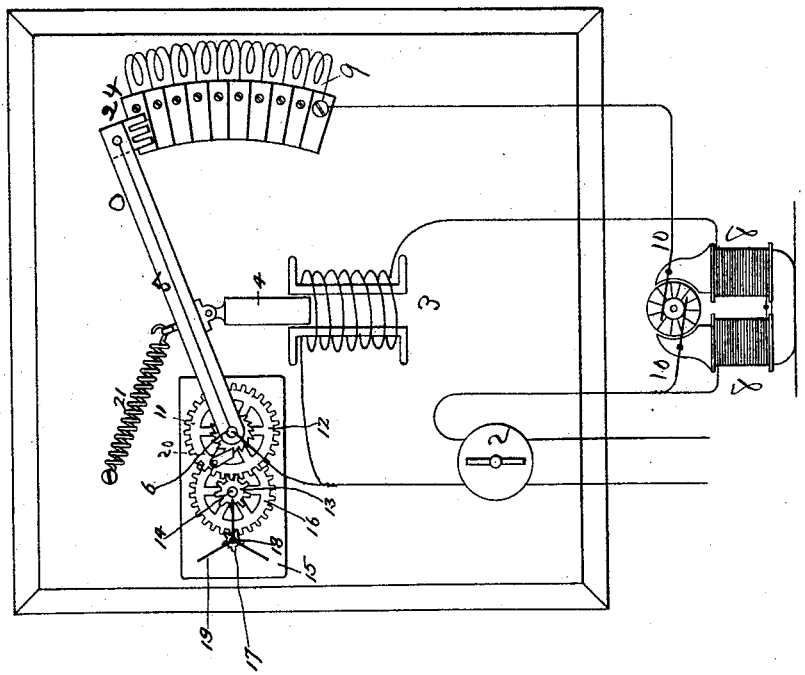
Figure 1:
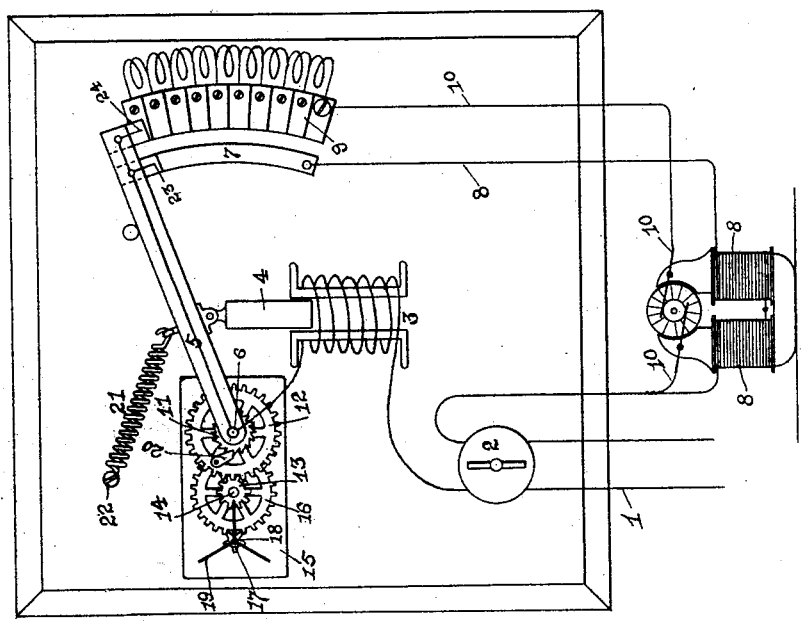
Figure 4:
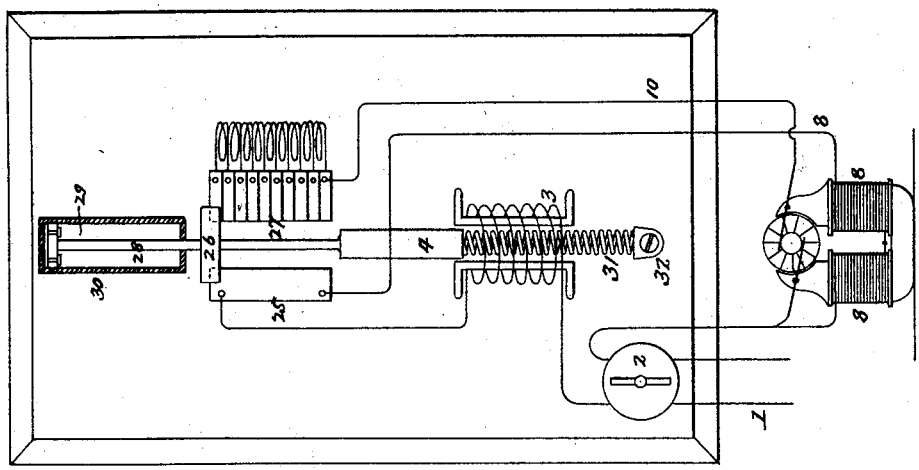
Figure 3:
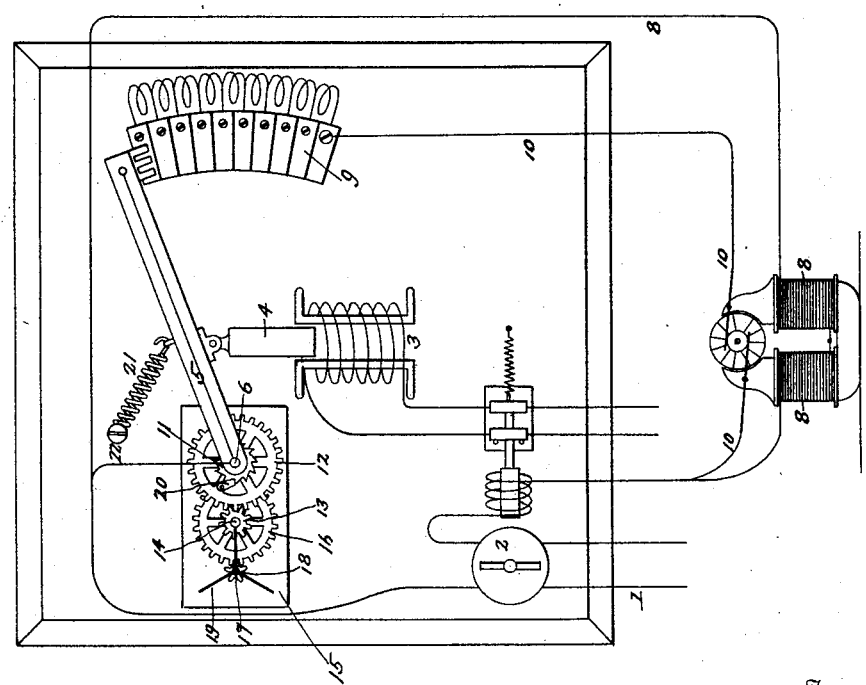

In the drawings, Figure 1 is a diagram of my switch, showing helix for moving resistance-bar operated by main-line current which passes to both armature and field. Fig. 2 is a diagram showing helix operated by field-branch of main-line current. Fig. 3 is a diagram showing helix operated by independent circuit. Fig. 4 is a diagram showing modified form of resistance device operated by main-line current.

Referring to Fig. 1, 1 is the main line carrying current from generator; 2, switch; 3, solenoid formed of main-line wire; 4, solenoid-core; 5, resistance-bar pivoted at 6 and engaging contact-plate 7 in field-magnet line 8 and resistance-coil 9 in armature-line 10. The resistance-bar 5 is securely attached to the stud 6, and on said stud is keyed the ratchet-wheel 11. Journaled freely on the stud 6 is the gear 12, said gear meshing with pinion 13, keyed to a stud 14 set in plate 15. On the same stud 14 is keyed the gear 16, which meshes with a pinion 17, keyed to a stud 18, also set into plate 15. On the top of this stud 18 is secured a fan 19, the revolution of which governs the motion of the resistance-bar 5 when reducing the resistance. On the top of gear 12 is pivoted a pawl 20, which engages the ratchet-wheel 11, secured to the resistance-bar 5, and connects said bar with the train 12 13 16 17 and fan 19, by which its motion in one direction is governed. The core 4 is secured to the resistance-bar in any suitable manner, and serves to move the resistance-bar in one direction when a current is passed through the helix 3. To the opposite side of the resistance-bar is secured a retractile spring 21, the other end of which is attached to a stud or screw 22 set in the frame of the device. The end of the resistance-bar 5 is provided with two contact-fingers, one—23—engaging the plate 7 and sending current to the field-magnets of the motor, and the other—24—making contact with the resistance-coils 9, and sending current through said coils to the armature of the motor. The resistance-coils 9 are of any usual form and consist of plates of metal insulated from one another, except where they are connected by coils of German-silver or other wire.

The operation of this device is as follows: When a current is turned on the line by operation of the switch 2, it will flow through the solenoid-coil 3 down the resistance-bar 5, divide at the end, and part go through finger 23, plate 7, and wire 8 to field of motor, the other part through finger 24, resistance-coils 9, and line 10 to armature. The passage of the current through the resistance-coils 9 will so reduce it as to prevent its injuring the armature and cause the armature to start slowly. As soon as the current begins to flow through the solenoid 3 it will attract its armature and begin to pull the resistance-bar toward the solenoid and thus cut out the resistance, notwithstanding the retractile influence of the spring 21, which acts in an opposite direction, the solenoid being stronger than the spring; but in order to safely start the motor the current must be put on gradually until the speed of the armature is great enough to generate sufficient counter electro-motive force to prevent the full current doing any harm. This gradual motion of the resistance-bar is produced by the train 12 13 16 17 and fan 19, which are connected to the resistance-bar by the pawl 20 and ratchet-wheel 11. If now the generator of current be shut down wholly or partially, or the switch turned so as to cut off all of the current, the solenoid will at once cease to act and the spring 21 will draw the resistance-bar back to its primary position, as shown in Fig. 1. This action should be a quick one, because if the current is suddenly cut off and then turned on again, unless the resistance be reintroduced into the circuit, all the bad effects of a full current suddenly turned on the armature will result, and this is one of the especial features of my invention and one that is not found in any device heretofore invented. It will be noticed that this action is purely automatic and instantaneous.

Referring now to Fig. 2, the structure there shown is identical with that of Fig. 1, except that the wiring is different. The solenoid in this case is formed of the field-magnet wire, and the resistance-bar has but one finger.

Referring to Fig. 3, the structure is here again identical, but wiring is different. In this case an independent circuit is employed to operate the solenoid, which in its turn is switched by the operation of a solenoid placed in the main-line circuit.

Referring to Fig. 4, a different form of device for cutting resistance in and out of the circuit is shown. This device consists of a plate 25, through which the line passes, and a conducting-bridge 26, one end of which rests upon the plate 25 and the other end upon one of the plates 27 of the resistance-coils. To the bridge is secured a rod 28, extending on either side of it. On one end of this rod is attached a plunger 29, which fits into a dash-pot 30 and controls the motion of the bridge in one direction, a valve in plunger leaving bridge free to move in opposite directions. The other end of the rod 28 is secured to the helix-core 4, by which the bridge is drawn over the resistance-plates and the resistance thus removed from the circuit. The spring 31, secured to the stud 32 at one end, bears with its other end upon the core 4, and serves, when the current is withdrawn, to push the bridge 26 back to its primary position and thus reintroduce the resistance into the circuit, where it will be ready to protect the armature when the current is again put on the line.

I have illustrated these several forms of structure, through which my invention may be applied for the purpose of showing that my invention and claim is not and should not be confined to any one of these forms, but includes them all or any modification of them by which my invention may be utilized.

What I claim as new is—

In an automatic switch, the combination of a main line which is divided into two branches, said branches reuniting again, an electric motor the field of which is included in one branch and the armature in the other, resistance-coils and a resistance-bar co-operating therewith to cut portions of said resistance into or out of the circuit included in the armature branch of the main line, a governor connected to and controlling the motion of the resistance-bar in the direction in which it reduces the resistance in the armature-circuit, but allowing it to move freely in the opposite direction, and an electrical device controlled by the main-line current for moving the resistance-bar in the direction in which it will reduce the resistance in the armature-circuit, and a spring or other equivalent device for moving the bar in the opposite direction, substantially as described.

In witness whereof I have hereunto set my hand this 14th day of February, 1889.

GEORGE H. WHITTINGHAM.

Attest:
FELIX R. SULLIVAN,
GEO. E. SAVILLE.